US009047737B2

(12) United States Patent
Brooks et al.

(10) Patent No.: US 9,047,737 B2
(45) Date of Patent: Jun. 2, 2015

(54) WEB BASED METHODS AND APPARATUS FOR PARIMUTUAL HISTORICAL GAMING

(75) Inventors: Lawrence R. Brooks, Phoenix, MD (US); Robert Eric Jackson, Hot Springs, AR (US)

(73) Assignee: Race Tech LLC, St. Louis, MO (US)

( * ) Notice: Subject to any disclaimer, the term of this patent is extended or adjusted under 35 U.S.C. 154(b) by 237 days.

(21) Appl. No.: 13/601,427

(22) Filed: Aug. 31, 2012

(65) Prior Publication Data

US 2014/0066189 A1 Mar. 6, 2014

(51) Int. Cl.

*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.

CPC .................................. *G07F 17/3288* (2013.01)

(58) Field of Classification Search

USPC ..................................... 463/6, 25, 28, 42, 43
See application file for complete search history.

(56) References Cited

U.S. PATENT DOCUMENTS 3,645,531 A 2/1972 Wright
5,275,400 A 1/1994 Weingardt et al.
5,411,258 A 5/1995 Wilson et al.
5,476,259 A 12/1995 Weingardt
5,779,547 A 7/1998 SoRelle et al.
5,830,068 A 11/1998 Brenner et al.
5,830,069 A 11/1998 Soltesz et al.
5,846,132 A 12/1998 Junkin
5,888,136 A 3/1999 Herbert
5,984,779 A 11/1999 Bridgeman et al.
6,152,822 A 11/2000 Herbert
6,358,150 B1 * 3/2002 Mir et al. ....................... 463/28
6,450,887 B1 9/2002 Mir et al.
6,837,791 B1 * 1/2005 Ramsey et al. ................. 463/42
8,241,110 B2 * 8/2012 Katz et al. ....................... 463/25

OTHER PUBLICATIONS

PCT International Search Report for related application PCT/US13/56822 dated Jan. 7, 2014.

* cited by examiner

*Primary Examiner* — Adetokunbo O Torimiro
(74) *Attorney, Agent, or Firm* — Armstrong Teasdale LLP

(57) ABSTRACT

A system for parimutuel wagering on actual past events includes, in one embodiment, a video server including a database having video images of gaming events stored therein, a game server including a computer system configured to facilitate pari-mutuel wagering on actual past events and to permit a player to select a percentage weight for each of a plurality of handicapping factors, and a plurality of terminals. The video server and plurality of terminals are communicatably coupled to the game server.

21 Claims, 8 Drawing Sheets

WEB BASED METHODS AND APPARATUS FOR PARIMUTUAL HISTORICAL GAMING

BACKGROUND OF THE DISCLOSURE

The field of the disclosure relates generally to gaming devices, and more specifically, to a gaming device which enables parimutuel betting on historical races, for example, horse and dog races.

Parimutuel racetrack systems, known as "totalisators" or "tote systems", commonly offer pools such as the Pick-6 and the Twin-Trifecta, which are more difficult to win than the simpler win, place or show pools. An increased difficulty of winning results in a decreased frequency of payoff, and consequently, higher payoff. In the Pick-6, if no player exactly matches the winners of all 6 races, a portion of the pool may be paid as a consolation to lesser winners, and the remainder of the pool may be carried forward, progressively increasing from day to day until a player exactly matches the winners. In the Twin-Trifecta, the winners of one Trifecta (selecting the first three winners of a race in exact order) may be paid a portion of the pool. A second Trifecta is then offered to those winners only. Until one or more players win both pools consecutively, the remainder of the pool may be carried forward, progressively increasing. The racing industry has seen a great increase in competition from lotteries and casinos. At least some patrons prefer a more immediate reward and higher frequency wagering than customarily offered at race tracks. For example, a typical racetrack offers one race every half hour. A casino having slot machines, however, offers a patron the opportunity to place a wager that can be won or lost every few seconds.

It would be preferable, of course, to provide patrons with an opportunity to place wagers on a game which supports the racetrack sport. For example, some racetrack operators offer "simulcasting" which enables patrons to wager on races televised from other sites rather than watching a live race. Simulcasting allows racetrack owners to offer more variety to their patrons in addition to the local live racing, and also facilitates maintaining operations even when the local racing season is over. Although simulcasting does enhance patron loyalty, the number of wagers a patron can place is still limited, particularly in comparison to a slot machine.

Known video and mechanical racing games have fixed odds. Such fixed odds typically are required in order to comply with the applicable regulations of lotteries and casinos. However, for at least some patrons, fixed odds games typically are less enjoyable than parimutuel wagers. In addition, known racing games normally only simulate a real event, and rather than an actual underlying sport.

It would be desirable to provide a wagering mechanism which incorporates aspects of traditional racetrack wagers, e.g., parimutuel methods, progressively increasing carry-over pool for a large payoff, a more frequent consolation payoff to keep interest from waning, and a series of related pools, yet which also can be played quickly, with a possible instant payoff.

BRIEF DESCRIPTION OF THE INVENTION

In one aspect, a system for parimutuel wagering on actual past events is provided. The system includes a video server including a database having video images of gaming events stored therein, a game server including a computer system configured to facilitate pari-mutuel wagering on actual past events and to permit a player to select a percentage weight for each of a plurality of handicapping factors, and a gateway to the game server. The gateway is communicably coupled to the game server. The system also includes a plurality of game terminals, wherein the video server and the plurality of game terminals are communicatably coupled to the game server by a first wide area network.

In another aspect, a method for parimutual wagering on actual past events is provided. The method includes accessing a system for parimutuel wagering on actual past events, the system including a video server, a game server, a gateway to the game server, a plurality of game terminals, and a wide area network. The video server, the gateway to the game server, and the plurality of game terminals are communicably coupled to the wide area network. The video server includes a database having video images of gaming events stored therein. The game server is communicably coupled to the gateway, and includes a computer system configured to facilitate parimutuel wagering on actual past events by permitting a player to select the winners of these past events and to permit the player to select a percentage weight for each of a plurality of handicapping factors. The computer system includes at least one administrative terminal. The method further includes establishing a credit balance, displaying a game selection menu on the game terminal, receiving player game selection input through the game terminal, displaying a winner selection menu and historical racing data on the game terminal, receiving player winner selections and game start input through the game terminal displaying race results and player winner selection comparison on the terminal, and determining if player won and displaying message on the game terminal.

In another aspect, a system for parimutuel wagering on actual past events is provided. The system includes a video server including a database having video images of gaming events stored therein, a game server including a computer system configured to facilitate pari-mutuel wagering on actual past events and including seed pool auto-correcting software to provide automatic distribution of funds to each individual game seed pools from a main seed pool reserve. The system also includes a gateway to the game server, the gateway communicably coupled to the game server, and a plurality of game terminals, where the video server and the plurality of game terminals are communicatably coupled to the game server by a first wide area network.

DETAILED DESCRIPTION OF THE INVENTION

Figure 1:
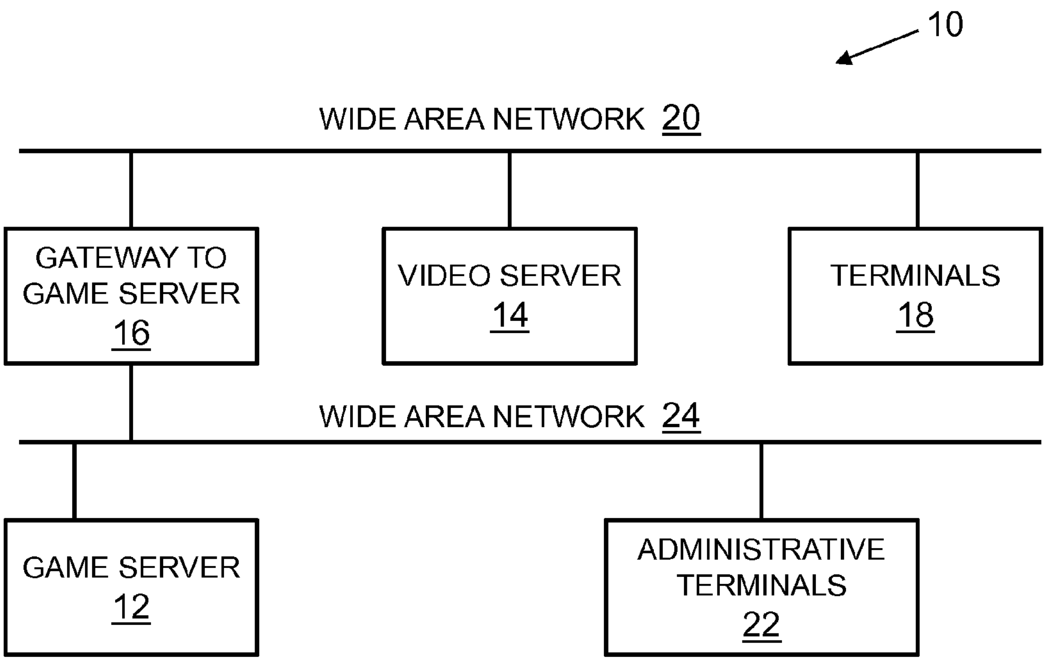
FIG. 1 is a block diagram of a game system.

A gaming system in one exemplary embodiment includes a game server, a video server, a gateway to the game server, a gateway to a tote system, and game terminals are described in detail below. Many variations of the system are possible. For example, the present gaming system is not limited to being practiced in connection with the system architecture described below and many other system architectures could be utilized.

In one aspect, the present gaming system enables parimutuel wagering with instant payoffs on actual past events. In parimutuel wagering, the players are playing against each other, and the "house" or the establishment conducting the game receives a commission on all wagers placed. Parimutuel wagering games are distinguishable from slot games or non-parimutuel wagering games where the players are playing against the "house" or establishment conducting the game. The gaming system, in one embodiment, includes a plurality of terminals coupled to a game server through, for example, a wide area network such as the internet. The terminals are computers configured to communicably connect to a wide area network and include a user interface such as a keyboard and a video monitor. The terminals enable a player to establish an account, to enter a wager, to receive a video/audio play-back, and to review the player's account balance. The game server is a computer system configured to manage the entire game system. For example, the server maintains databases, maintains player accounts, controls and accounts for the transactions with the terminals, controls the flow of data from a video server to the terminals, collates pools from all sources and computes winnings, and provides detailed statistics for the disbursement of funds.

The gaming system also includes a video server interface for providing high speed delivery of selected video clips from a historical database, and a tote system interface which is coupled to a standard racetrack totalisator system to allow the multi-function wagering terminal to operate as a standard self-service racetrack wagering terminal. Other interfaces to other types of wagering systems, such as a lottery, could also be provided.

Generally, and in operation, a player attempts to choose the winners of an unknown past event. Although the player does not know which event will be presented, some skill data may be shown on the video display, such as the relative past performance of competitors. After the player makes a selection of winners, the identity of the event is revealed, a video segment of the event is displayed, and the actual winners are presented. If the player correctly picked the winners, the player qualifies for an instant payoff determined in accordance with parimutuel methods. Winning multiple games in a session or selecting the maximum wager amount may qualify the player to win a larger payoff as well.

One aspect of the present gaming system is to enable parimutuel wagering to offer instant payoffs. In the paradigm of live parimutuel wagering, a number of players place bets on the outcome of a single event. The players then wait for the results of the event, and then the winning players share the profits from their combined pool of wagers. Pools, such as, the Pick-6 and Twin-Trifecta add the elements of multi-tiered payoffs and a progressively increasing carry-over pool created by withholding a portion of the profits.

The present gaming system emphasizes the role of the progressive carry-over pools, so that all tiers of winning payoffs are made from progressive pools. Each player is presented with a unique event, so there is no pooling of other players' wagers on that event. Each wager forms a trivial pool of one, and either loses and is apportioned among the tiers of progressive pools, or wins and is awarded one of the progressive pools. Since the event is served up on demand from the historical library, not on a schedule, a winning payoff may be made instantly. The pools may be shared between web based gaming systems and a land based game system. The web based gaming system may provide for inter-state wagering with comingled or sharing of the gaming pools.

The gaming system may be utilized in connection with many different types of races, such as, for example, animal races, horse races, dog races, vehicle races, and the like. In addition, the gaming system may be utilized in connection with other types of events. Importantly, the gaming system supports and rewards the racing industry which produced the original wagering performances, which adds continuing "shelf life" and revenues to the original event.

FIG. 1 is a block diagram of a game system 10 that includes a game server 12, a video server 14, a gateway 16 to game server 12, and terminals 18, coupled by a wide area network 20. In another embodiment, at least one additional terminal 18 is coupled to a high speed local area network in addition to terminals 18 coupled to the wide area network 20. Administrative terminals 22 are connected to game server 12 through a wide area network 24. Gateway 16 also connects to game server 12 through wide area network 24. Wide area networks 20 and 24, for example, may include in one embodiment at least two local area networks, and in another embodiment, wide area network 20 is the Internet, and may include leased and dial-up telephone lines, and/or satellites. Gateway 16, for example, may be a "router" from Cisco Systems, Inc., San Jose, Calif. 95134. Game server 12, for example, may be composed of business file servers commercially available from Dell Computer Corporation, Round Rock, Tex., 78682, or fault-tolerant systems commercially available from Stratus Computer, Inc., Marlboro, Mass., 01752. Video server 14 may, for example, be a server commercially available from Compaq Computer Corporation, or from N-Cube, Foster City, Calif., 94404-1184. An exemplary configuration of servers 12 and 14 is described below in more detail.

Components of system 10 may be distributed geographically over a number of sites. For example, game server 12 can be located at a central operations center, connected over wide area network 24 to administrative terminals 22. If a high communication band width is required to transmit video images, video server 14 can be connected to the same component of wide area network 20 as are terminals 18. Transactions communicated between game server 12 and terminals 18, or game server 12 and administrative terminals 22 are small relative to video images, and so require a smaller share of the capacity of wide area networks 20 and 24.

Game server 12 manages system 10. Specifically, game server 12 maintains databases, controls and accounts for the transactions with terminals 18, controls the flow of data from video server 14 to terminals 18, manages the games by collating pools from all sources and computing the winnings, and provides detailed statistics for the disbursement of funds.

Game server 12 includes multiple databases including a game profile and control database, a liability database, a video access database, a skill database, and a network profile and control database. With respect to game profile and control database, such database contains data relating to which games are currently in use, and the current status of the games. The hierarchy of game definitions is as follows.

Game Rule Tables

Game Definition

Game Group

Game rules tables define attributes of games, including such fixed attributes as the number of selections in a bet, the number of winning positions to consider, and the method of matching winning positions to bet selections. Game rule tables also contain data relating to variations in the rules for each game which the operator may alter. These options include, for example, the percentages of sales which are allotted to the tiers of major and minor progressive pools and to commissions (take-outs), denomination of a basic wager, minimum payment levels, pattern of repeated wins needed to qualify for the major progressive pool, which subset of the video library is the subject of the wager, and which type of skill data to present to the player before his wager. An exemplary set of rules for one possible game, referred to herein as "Quick Trifecta", is set forth in Appendix A, and an exemplary set of rules for another possible game, referred to herein as "Thoroughbred Mania®", is set forth in Appendix B.

In the game definition database, data is stored to define each instance of a game upon which wagers can be placed. Attributes include, for example, the game rule table selection, current status such as "betting open", "open time", and "final close time", and amounts in the minor and major progressive pools. Players using terminals 18 and allowed to wager on this game compete against each other for the progressive pools. The group of terminals 18 involved in such a progressive pool may also be referred to herein as a "carrousel".

The game group database defines a group of carrousels in a geographic or demographic region in which a collection of games combine their major progressive pools into one combined progressive pool. Players using terminals 18 in such a group compete for the combined progressive pool. There may be a network of regional game systems collating major progressive pools into one master system, e.g., a master game server.

The liability database contains tables required for reporting money liabilities. The tables contain the information set forth below.

Commissions
Cooperating Industry Entitlements
Player Payment
Breakage
Minimum Payments
Carry-Over Accounts Commissions are taxes and other fixed percentages of sales which are removed before determination of the progressive pool allotments. Cooperating industry entitlements are distributions to the racing industry or other such interest groups, such as racetracks, horse/dog owners, jockeys, and horseman's groups. Player payments are total amounts paid to winning players and a history of such payments. Breakage refers to the price round-off not returned to the pools, including separation of the regulated round-off and any higher actual round-off. Minimum payments refer to minimum payment levels including separation of the regulated minimum and any higher actual minimum. Carry-over accounts refer to amounts which are carried-over from one period to another for the progressive pools of each game.

The video access database is a catalog in game server 12 of the video image library stored in video server 14. The catalog is organized into "video groups", each sorted to meet the access requirements of specific games. For example, consider the Quick Trifecta game, described in Appendix A. When the player commits to a wager, then game server 12 will select at random a combination of three contestants, as yet unknown to the player. A race with those first three finishers is then selected as the object of the wager. After the player enters his selections, the identity of the race is revealed while the video image is downloaded and may be played on the video display. A video group for the Quick Trifecta game would be sorted so that all videos with a selected combination of the first three finishers may be located, then one of them may be chosen. In another embodiment, the video image is only played if the player decides to view the video. For example, a video button may be positioned on game terminal 18, or a video button icon on a touch screen of game terminal 18 to permit the player to view the video by pressing the button or button icon. In another embodiment, video server 14 may be a centralized distribution server to broadcast video to multiple locations.

The skill database is closely related to the video access database. When a game requires that the player exercise an element of skill, data such as past performance of the contestants will be presented on the video display before the player enters selections. Data may be presented as a bar chart, a pie chart, numerically, or in another understandable form. Associated with each video image is a list of several kinds of skill data, along with information on how each kind of data may be presented.

In one embodiment, a "Handi-Helper" function permits game players to make selections as to the 3 finishers that the player thinks will win the next race. The Handi-Helper function looks at the skill charts assigned to the player for the race to handicap and selects the top pick by averaging the chart values of all charts for all runners, and then selecting the runner with the highest, second highest, and third highest rating relative to the other runners.

Figure 2:
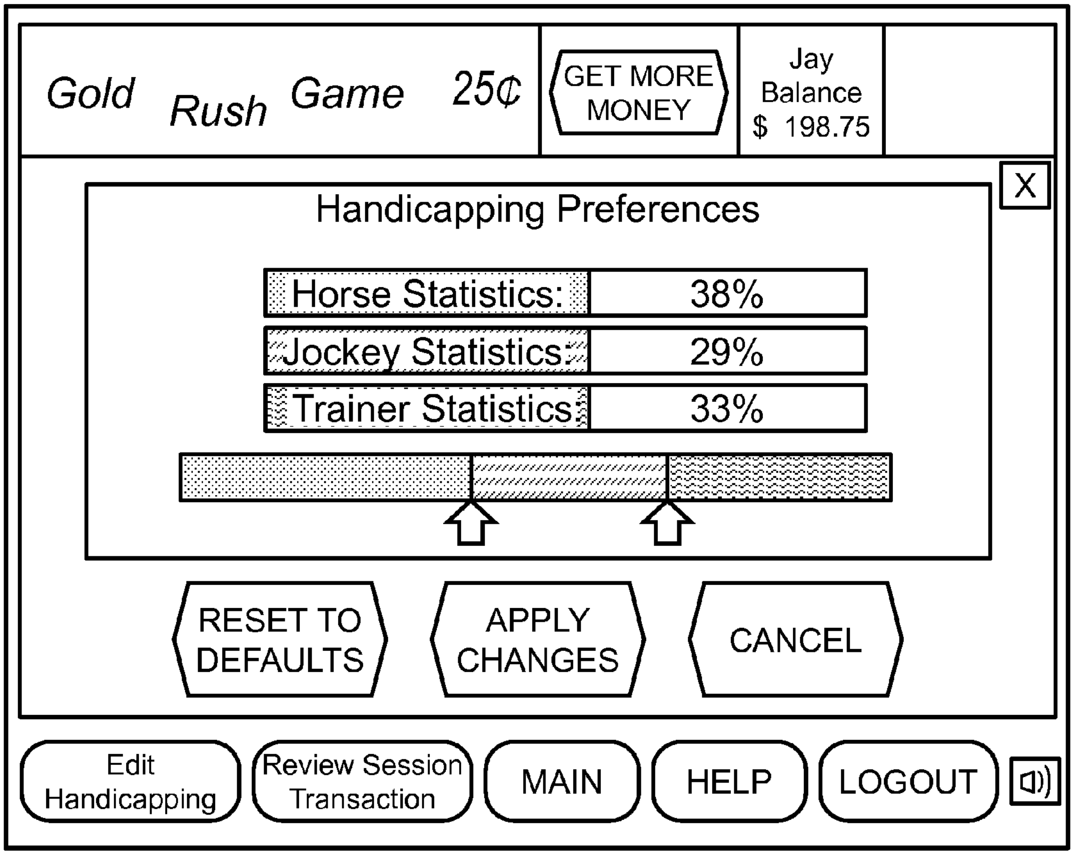
FIG. 2 is an exemplary screenshot of handicapping preferences.

In another embodiment, referring to FIG. 2, a "Skillenator" function is a modification of the Handi-Helper function that permits the player to customize the way that charts are averaged by choosing how the player wants the system to interpret the charts. The Skillenator function permits the player to select which of three handicapping categories the player believes is more likely to be important or predictive of a winning selection. Each potential skill element for a race is categorized as either a horse skill element, a jockey skill element, or a trainer skill element. The Skillenator settings are set by the player before game play, and are set as a percentage of 100. The player is allowed to set the Skillenator to a weighting percentage for each of the three categories. The Skillenator starts at settings of 33% horse, 33% jockey, and 33% trainer, which tells the system that each skill category is of equal chance of being predictive of the winning horses. The player may alter the Skillenator settings by changing the percentages with respect to each other. For instance, if the player believes that horse skill elements are more predictive, but jockey and trainer skill elements are of equal predictive values, the player may set the settings at 50% horse, and 25% jockey and 25% trainer.

When Skillenator is selected during game play for the player, the following process may be used to select runners. Each chart that has been selected for the next race by the system is reviewed in comparison with the Skillenator settings. If none of the charts have been given any weight (all are at 0% due to player choosing 0% for the categories of the charts found), then equal weight for each chart will be used. Also, each skill chart is sorted based on the runner's value. The chart is given its weight based on the chart's skill category. A point count for each runner for all charts is maintained, such that 100 points are added to the best horse of this skill chart, times the chart weight, 90 points for the second best horse times the weight, down to 10 for the worst times the weight. Ties are given the average of the number of horses tied for that position. For instance if there is a tie for the first, second and third horse chart value, each will be given (100+90+80)/3 times the weight, or 90 times the weight. A tie for first and second would be (100+90)/2 times the weight or 95 times the weight for each of the two horses. The runner point counts for all charts are sorted to find the top three horses. Ties are broken randomly should multiple runners have the same point counts. The number of horses in each race may be 10 horses, more than 10 horses, or less than 10 horses.

The player account database includes data unique to each player that has established an account with the game system operator. Before a player can place a bet using game system 10, the player establishes an account and establishes a credit balance in the account. The player account is created in any conventional manner, for example, with a credit card and the use of the terminal, or by mail. When establishing the account by mail, the credit balance can be established by a credit card, check, money order, bank draft, letter of credit, and the like. The database contains player information such as name, address, and social security number. The database is organized by account numbers assigned to individual players. Each player is also assigned a personal identification number (PIN) to secure the account, or other personal identification method such as a biometric measurement, such as, for example, finger or thumb prints, and eye scans. The player account database also stores the account balance, all wager transaction history, and all deposit and withdrawal transaction history.

The network profile and control database contains tables which define the communication network. The network is a hierarchy of nodes, as set forth below.

Game Server
Communication Concentrators
Game Terminals
Administrative Terminals
Video Server
Tote System Interface The communication concentrators are intermediate communication nodes for line multiplexing and protocol conversions. Examples of these communication nodes are internet proxy servers, Ethernet routers, switches, and hubs. Gateway 16 to game server 12, for example, can be a communication concentrator to convert between the internet protocol on wide area network 20 and another protocol on wide area network 24. Configuration of the game terminal population is under the direct control of the system operators from game server 12. All system control and reporting functions are performed using a network of administrative terminals 22 coupled to game server 12. Game server 12 supplies information enabling video server 14 to route video images directly to game terminals 18.

Game server 12 may also be utilized to upgrade and configure terminals 18. Game server 12 maintains a list of available configurations for terminals 18, and provides commands to modify and report the configuration tables. Server 12 also maintains the current version of the terminal software, and the ability to select different versions for subsequent download, for example, in one embodiment, as a set of Java applets executable by a web browser in terminal 18.

Game server 12 also gathers statistics during the game play cycle concerning the actual use of video clips. These statistics may be used for reporting of game usage, for control of online game play, for computation of payments, and for regulatory certification of the game terminal. Game usage statistics may be used to determine future variations in game control parameters such as locations, time-of-day, and types of events to offer. The statistics may also dynamically vary online game play patterns. For example, parameters may assure that the video selection process does not repeat a pattern of video clip displays within a controlled time period. Thus, a player would be unable to predict a selection pattern.

Video play statistics may be used to determine entitlements due to the racing (or other) industry which produced the original wagering performances. A variety of attributes of the video may be used, such as the racetrack, winning jockeys, and horse owners. In addition, play statistics can be used to certify that the payment rate to players conforms to any requirement.

Video server 14 provides high capacity storage of video images for system 10. Video server 14 may include, for example, a "Raid-5" disk array which combines high speed, reliability, and capacity. If dictated by high throughput requirements, video server 14 may be composed of several computer or disk storage modules.

In one embodiment of system 10, video server 14 would not contain any of the catalog data needed by the game server 12 to identify the video images. This separation of catalog data from video data has two benefits. First, little specialized software is required in the video server, since it can operate much like a file server. Second, video server 14 may be located separate from game server 12, in an area not under the direct supervision of the computer operation staff. Then security is enhanced in that illicit access to the video server reveals only videos, not a database revealing which videos are in actual use and correlating skill data with winning finishers. The process of creating the video clips and the corresponding catalogs would be accomplished in a separate computer system located in a secure facility.

In addition to playing the game, game terminal 18 may be operated as a self service racetrack terminal, connected to the parimutuel live racing totalisator system. The player could then bet on any live programs provided at the particular location. Accordingly, a separate connection between terminals 18 and the totalisator system is provided, as well as a connection to a video feed displaying live races. Such access to the totalisator system is provided via a gateway 16, whose task is to translate messages from the protocol used by the gaming system network to the protocol used by the totalisator system network. Many different totalisator system networks are commercially available and use different protocols, and gateway 16 must be programmed in accordance with the protocol of the target totalisator system, as is known in the art.

Game terminals 18 are configured to be easy to operate and user friendly. In one embodiment, game terminal 18 may be a browser based terminal Components of terminals 18 are computer industry standard devices and are commercially available through computer component suppliers. Generally, and as described below in more detail, terminal 18 includes a user interface having a touch activated, color display. Game terminals 18 may also include multiple interactive display screens to provide the game playing by the player, game video display of the race, and for providing player information and entertainment opportunities.

Figure 3:
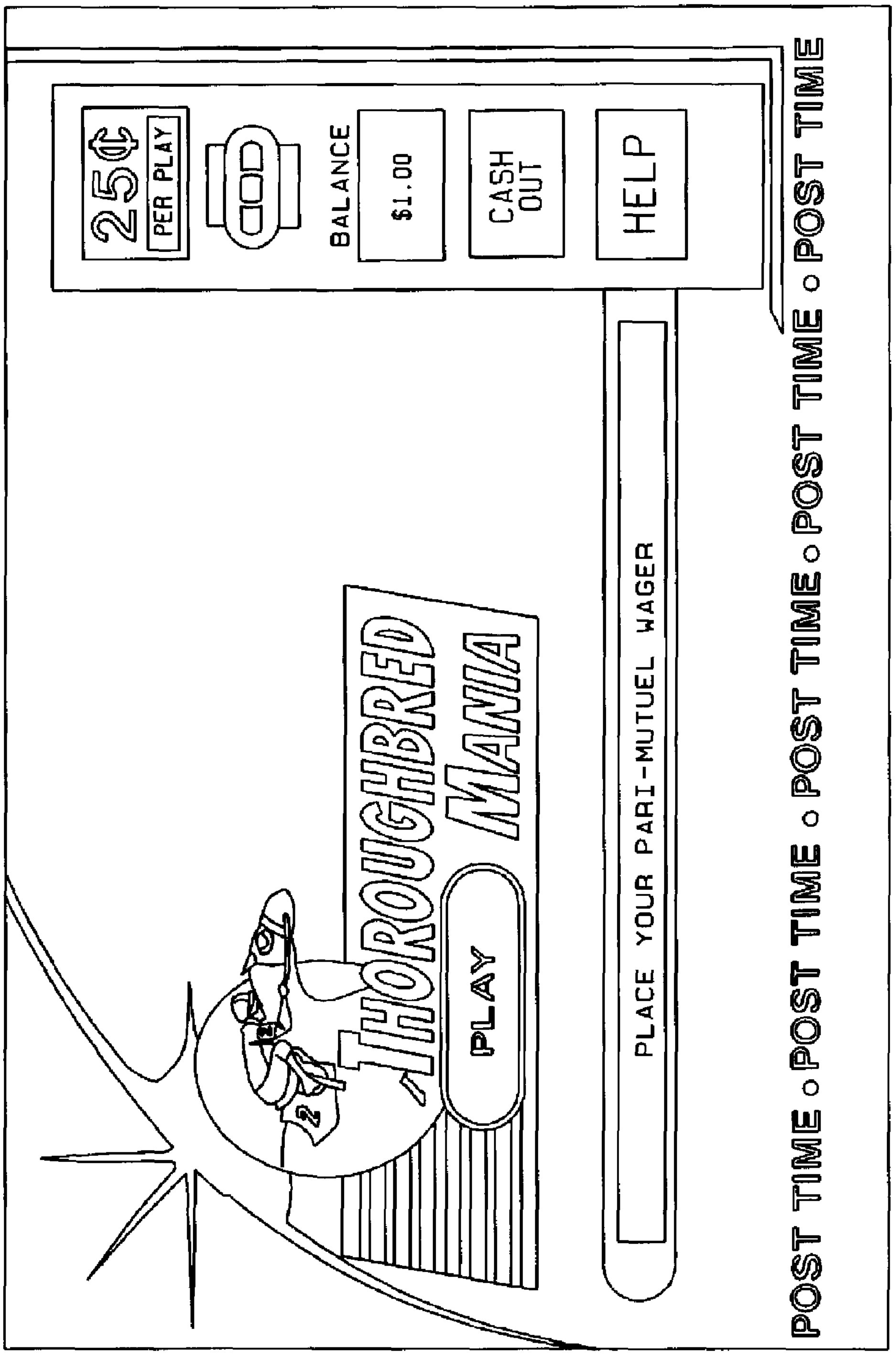
FIG. 3 is an exemplary game selection menu screen.
Figure 4:
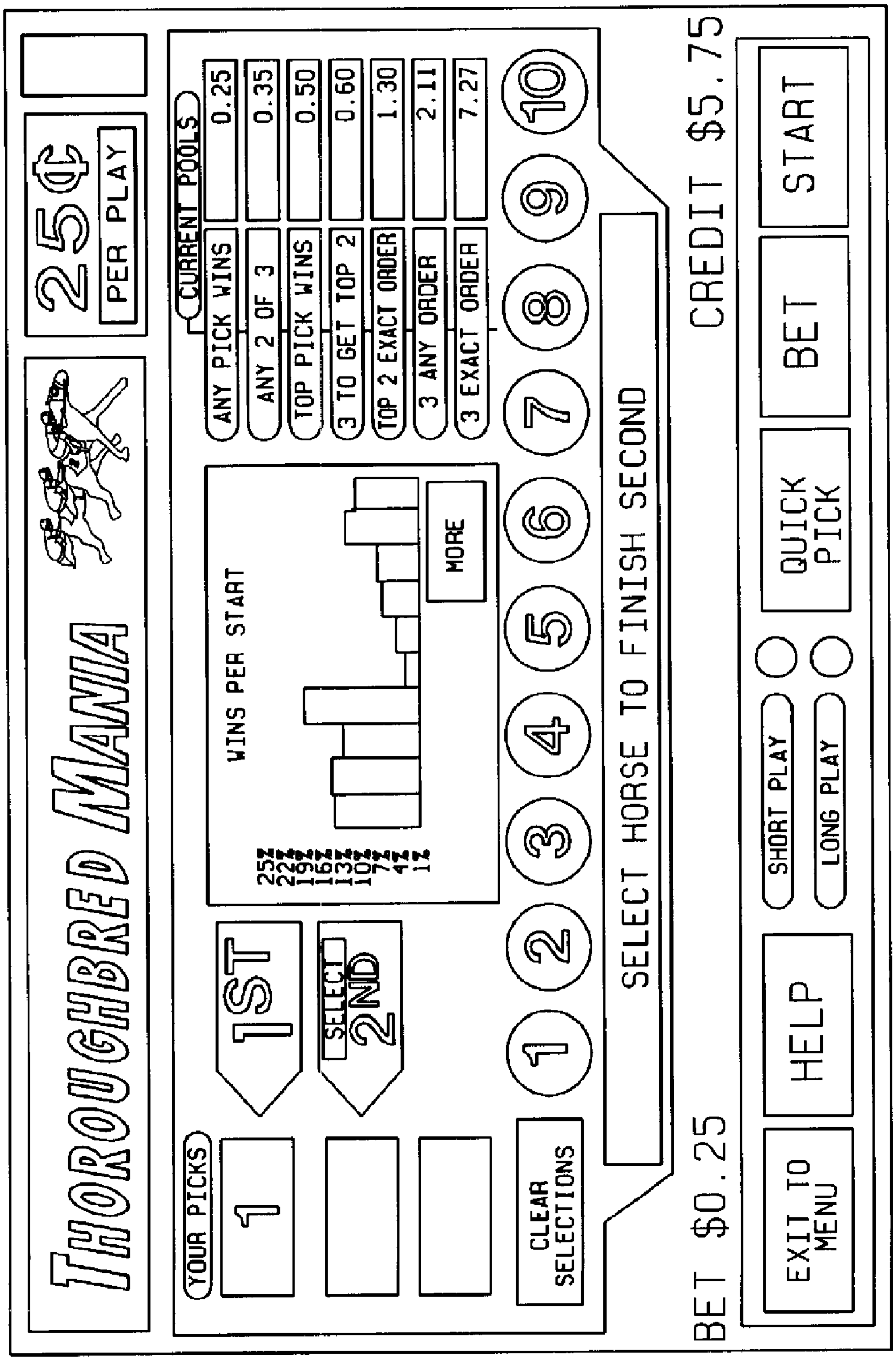
FIG. 4 is an exemplary winner selection screen during selection.

FIGS. 3-7 are exemplary screens displayed to a player by display 56. More specifically, FIG. 4 is a game selection menu screen. A player may select, for example, to play one of the instant racing games "Thoroughbred Mania®" or "Thundering Hounds®", or "Live Racing", or to be paid the credit balance ("Cash Out") currently displayed by terminal 18. Whenever the player inputs money through terminal 18, the balance amount displayed is adjusted to reflect the current balance.

FIG. 4 is a winner selection screen, depicted after the player has pressed the "Bet" button to commit a 25 cent wager, and has selected a horse to finish first. In another embodiment, penny parimutual wagering (fractional) may be used, where a non-uniform wager is used. The "Current Pools" show the constantly changing amounts for the various ways that this bet could win. This typically is the first screen shown to a player upon selecting one of the instant racing games. The player is provided with historical racing data, e.g., past-performance racing data in the form of a bar graph showing the relative merits of the horses. While selecting horses to finish first, second, and third, additional prompts may be displayed depending upon the type of game, e.g., Quick Trifecta. The player may have the system select the remaining winners by touching the "Quick Pick" button. If the player does not like his or the system pick, the selections can be deleted by touching the "Clear Selections" button. In addition, graphical icons may be utilized to represent each horse instead of numbers. The icons may be randomized on the display screen in a non-winning fashion.

Figure 5:
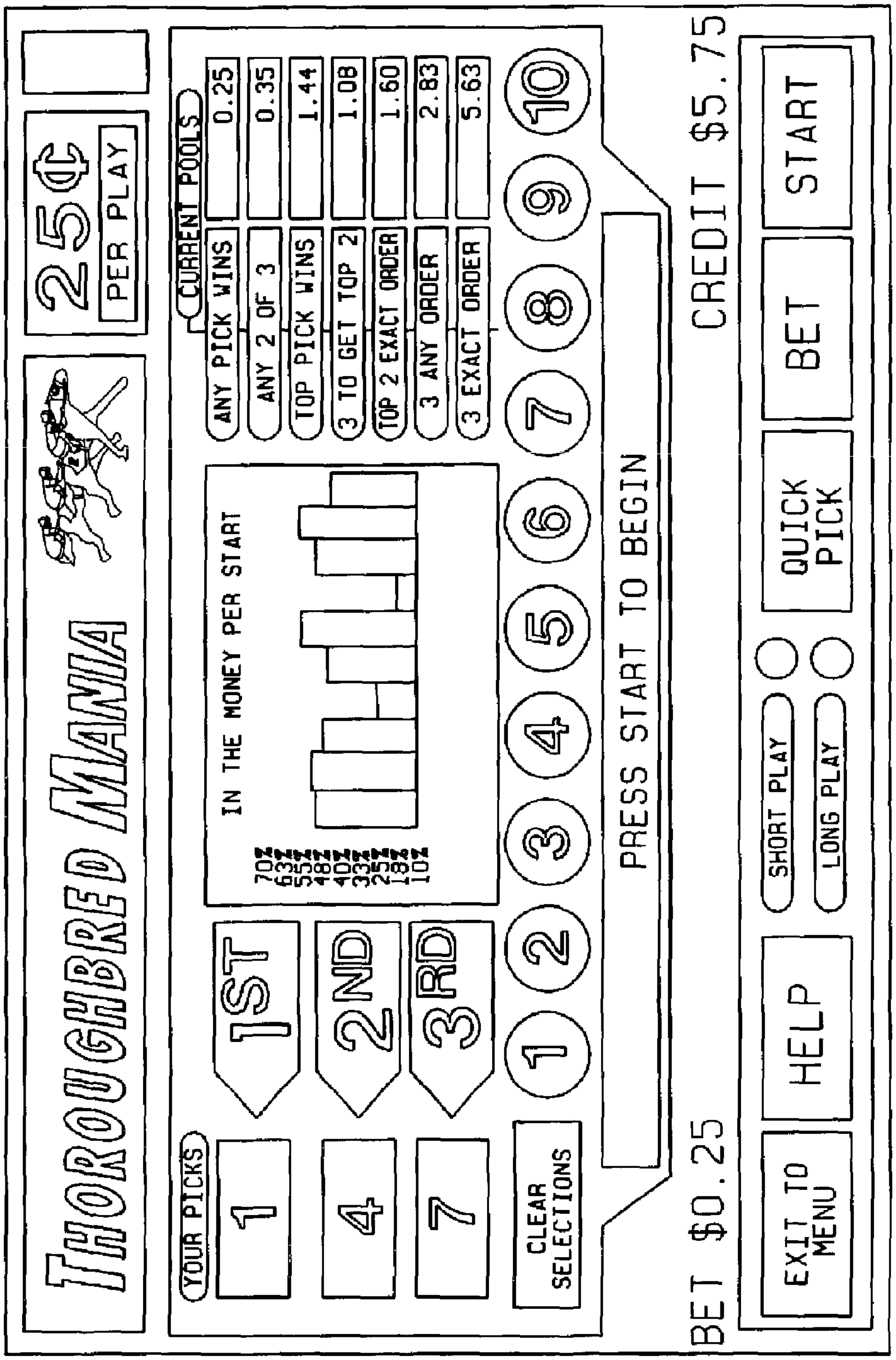
FIG. 5 is an exemplary winner selection screen with selections complete.
Figure 6:
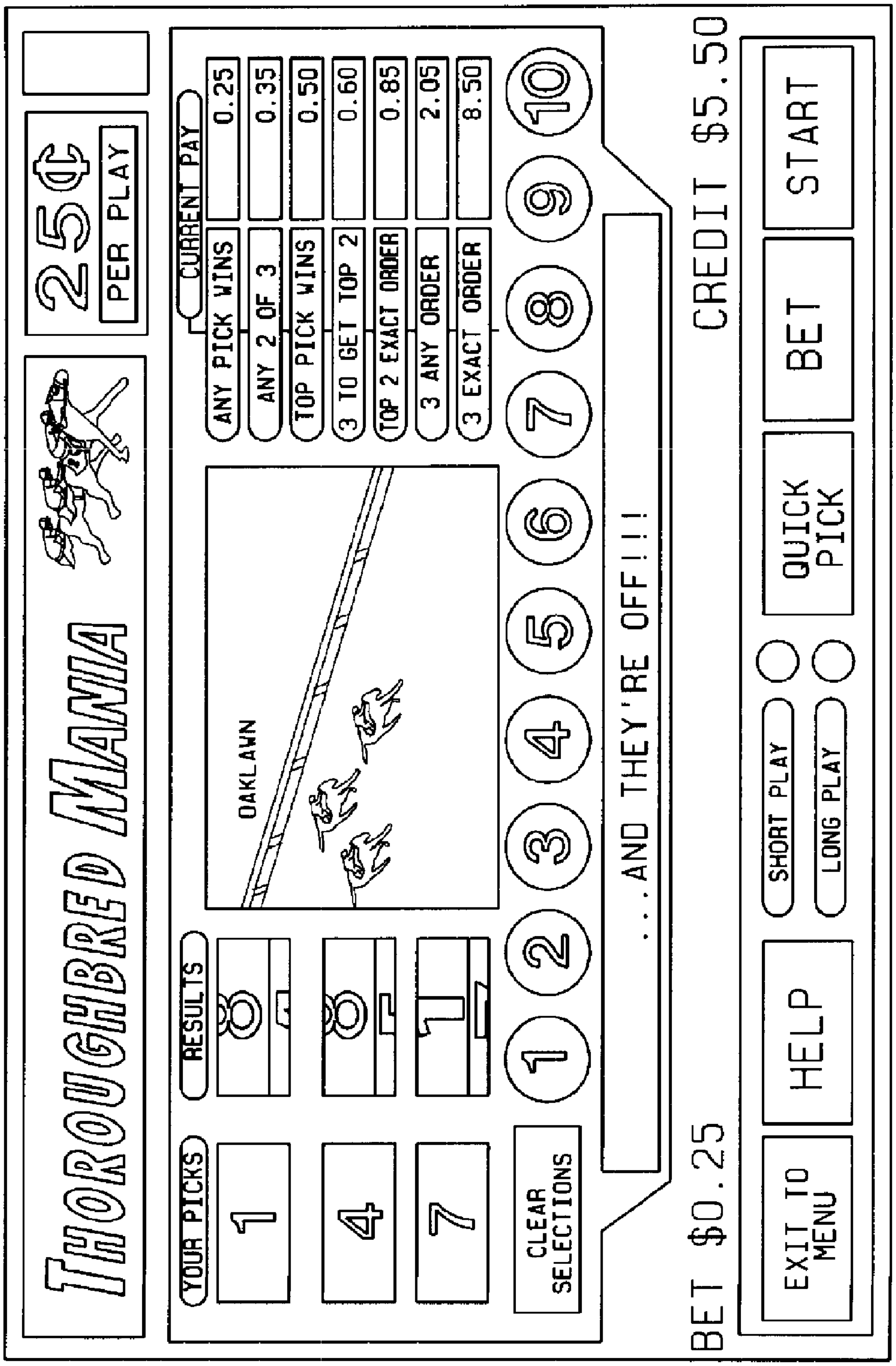
FIG. 6 is an exemplary video play screen

FIG. 5 is the winner selection screen, depicted after the player has selected all three horses. After making the required selections, the player then starts the race by touching the "Start Race" button. FIG. 6 is the video play screen, depicted while watching the race. The results are not yet revealed, and horse numbers are rolling past their display boxes. The "Current Pools" display is frozen showing the exact amounts that could be won by this bet.

Figure 7:
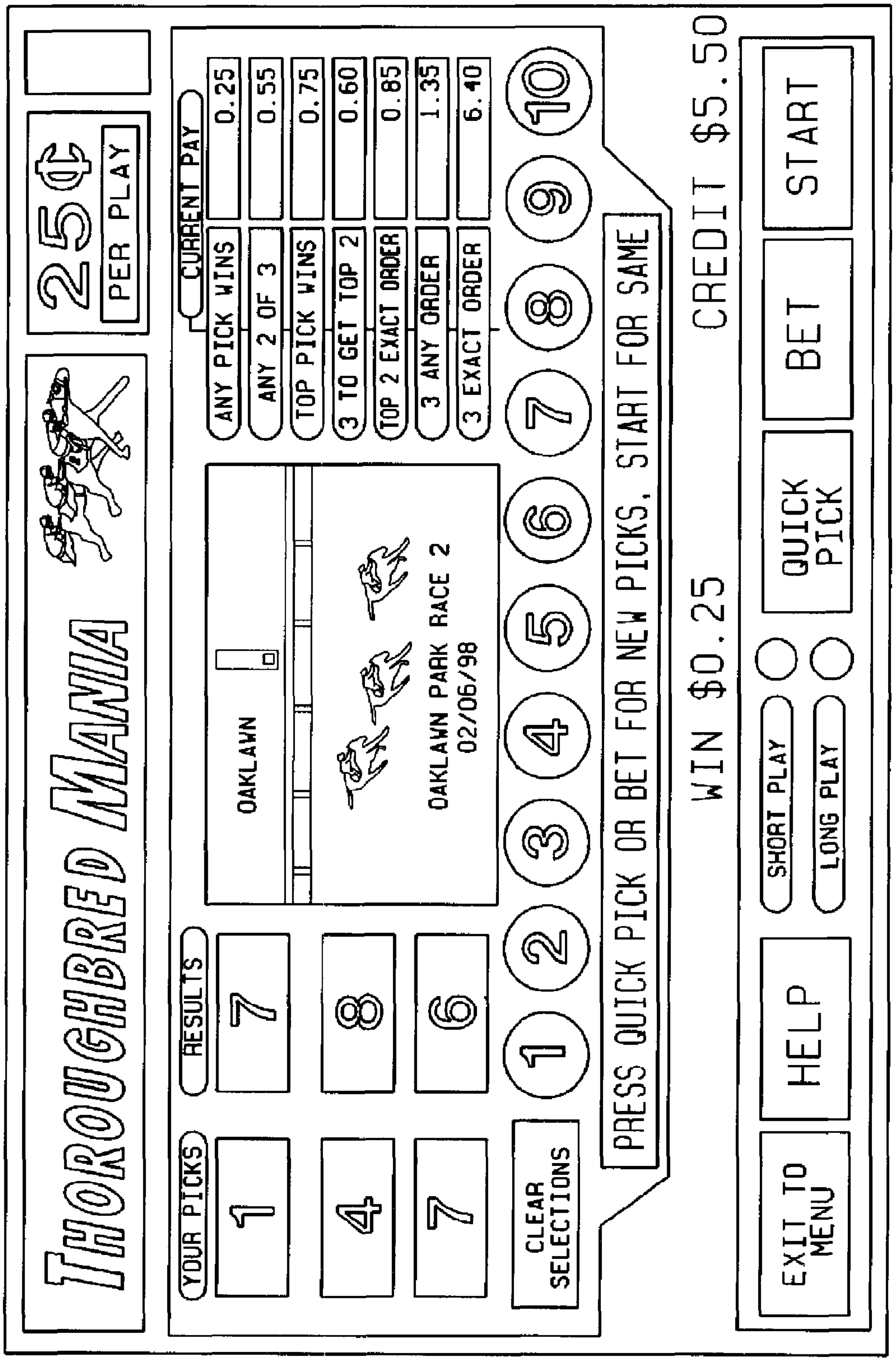
FIG. 7 is an exemplary result screen after a play.

FIG. 7 is the result screen after a play. The specific race video has finished playing, and the actual race results are shown. The players picks are displayed adjacent to the race results so that the player can quickly evaluate whether he won. The display also provides an indication as to whether the player won, e.g., "Any Pick Wins" is highlighted since the player's third selection won the race, and the amount won is shown below as "Win $0.25". Simply showing "Game Over" would indicate a loss. The player may also select to play again with new selections by pressing "Bet" or "Quick Pick" (shown in FIGS. 4-5), or to play again with the same selections by pressing "Start" (shown in FIG. 6). The player may also return to the "Main Menu" (e.g., FIG. 3). The updated credit balance also is displayed to the player, for example, as "Credit $5.50".

Each game has a designated seed pool reserve assigned and an initial seed pool to comply with regulation requirements and to minimize the risk of having a pool fall below zero. Typically, an operator sets each threshold value very high to avoid the possibility of dropping a pool below zero and to add additional money if a pool does hit zero. In one embodiment, the system is configured to have a threshold seed value and seed pool for each individual game. The accounting of each seed pool is independent. Threshold values are set to a very high amount in order to eliminate overall risk of any one seed pool dropping below zero.

In another embodiment, auto-correcting software may be used to utilize a main seed pool reserve within the gaming system. The software provides for automatic distribution of funds to each of the individual game seed pools when required. The software minimizes the risk of seed pools going negative and potentially reduce the overall initial seed pool investment. The software will permit the operator/commission to set the main seed pool reserve. For example, the original total seed pool reserve fund may be $52, 400.00 with each individual game seed pool reserve will have a reserve set to $100.00.

The gaming system software monitors the seed pool amounts for each game and deposit funds from the main seed pool reserve into the game seed pool to ensure pools do not drop below zero. The individual game seed pools are monitored and excess pool funds are deposited back into the main seed pool reserve to ensure it maintains proper balance. Individual variables may be established and monitored by the monitoring software to trigger should funds in the main seed pool reserve become critically low. The gaming system software may be modified to set a variable "critical" level for the seed pool reserve. The gaming system monitors the seed pool levels throughout the day (intervals may be predetermined). If the seed pool reserve hits the "critical" level an alert may be sent through the system. The gaming system will also be set to flag a seed pool if it hits zero by the end of the day. All games start off closed in the morning before opening. When morning procedures are run on the tote, all games are opened.

The software that opens the games checks for the seed protection option, and if a seed is equal to or less than zero, the system warns the operator via an automated alarm. Once the alarm is triggered then the operator may engage the appropriate authorities to determine the issue that caused the seed pool(s) to drop below zero and correct the issue. Once the issue has been corrected and authorization is given, then the game may be opened.

With respect to FIGS. 3-7, the following describes a typical interaction between terminal 18 and a player. Specifically, a player activates terminal 18 establishing credit. The player chooses the type of game, if more than one is offered. The player selects "Bet" or "Quick Pick" to commit a wager. Terminal 18 displays the available selections and may also display skill data to assist the player. In one embodiment, the features of Handi-Helper, Bet Max, and Start Game may be combined in one button to provide easier selection for the player.

The player makes a selection using the numbered buttons or "Quick Pick", then selects "Start". Terminal 18 reveals the identity of the event and plays a video segment, and finally displays the actual winning results. The amount of winnings, if any, and the new credit balance are displayed. The player either commences betting again, or chooses to stop playing and redeem any remaining credit balance. Rather than adding winnings to the credit balance, terminal 18 could issue coins immediately to the player. When the player terminates playing and redeems his credit balance, he may receive a printed credit voucher.

Certain games in the game system may be designated as a base game with which a bonus game is offered. The added bonus game may add excitement for the player by offering enhanced winning opportunities. In addition, the bonus game may extend time-on-machine for the enjoyment of the player.

When the player matches certain ways to win, a bonus game begins which could award the player additional winnings. Preferably the additional winnings may be distributed from a pari-mutuel bonus game pool allotted from wagers in the base game. In another embodiment, the additional winnings may be allotted from another source such as a promotional budget, or the winnings could take a non-monetary form such as a coupon. When the bonus game is complete, play returns to the base game. Any monetary payment to the player from the bonus game may be added to the payments accumulated by the base game.

In another embodiment, a bonus game outcome depends on selecting one or more additional races from the historical database. Other aspects of the same bonus game may depend on random events. In another embodiment, a Bonus Game outcome may depend entirely on random events. When random events are included in the bonus game, the player interacts in some way, such as uncovering hidden symbols or numbers. In another embodiment, the bonus game may proceed automatically with no player interaction. Both interactive and automatic aspects may be included in the same bonus game.

The gaming system has been described in an on demand mode where revealing the identity of the historical gaming event and the playing of a video segment of the event is performed immediately after the player makes his selections. However, the gaming system can be configured to use a periodic mode where the historical gaming event is identified and the video played periodically. For example every 30 seconds, every minute, every 5 minutes, or every 10 minutes. In the periodic mode, the players must make their selections before the end of a period.

Figure 8:
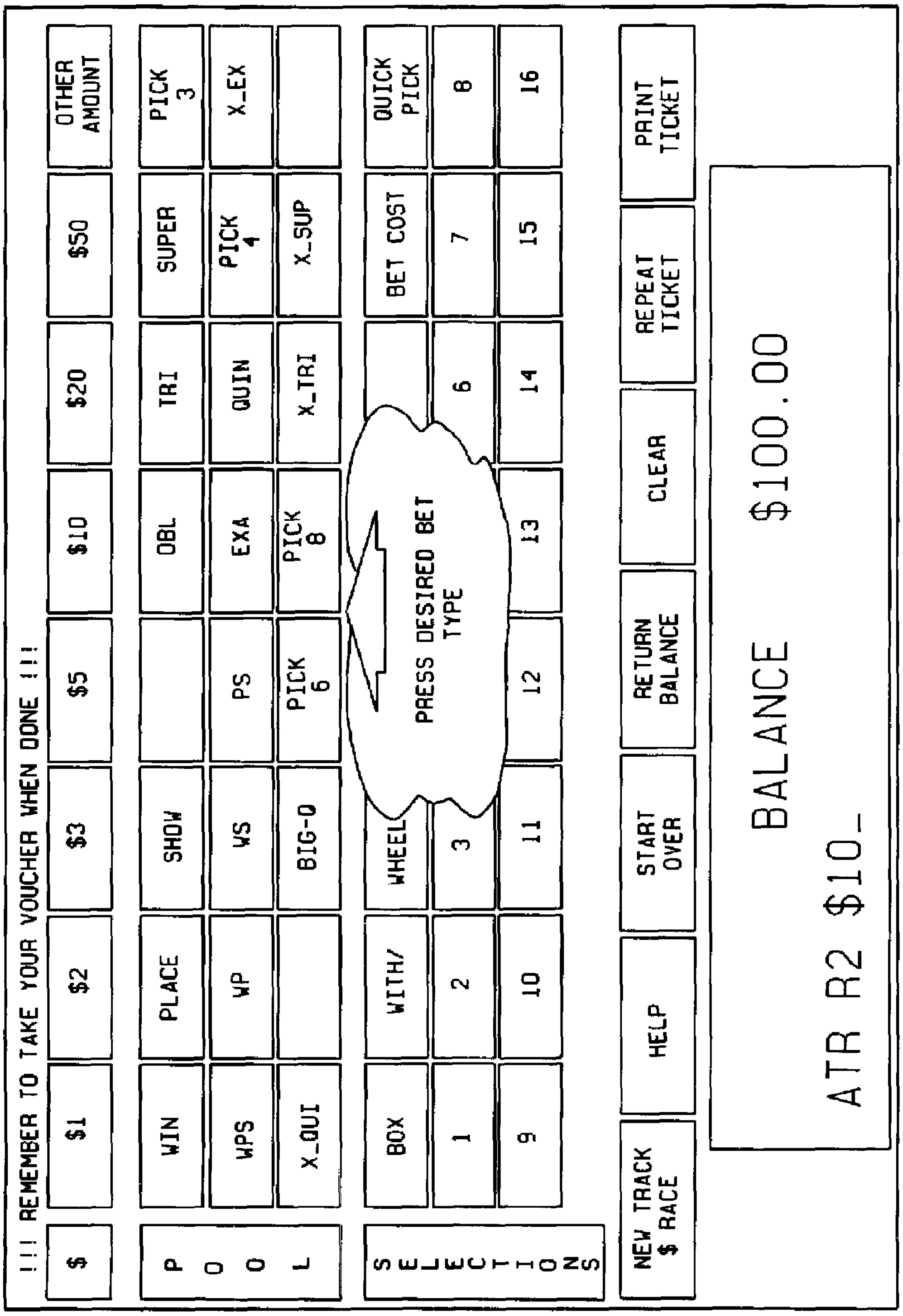
FIG. 8 is an exemplary screen for a self-service racetrack wagering mode.

FIG. 8 is an exemplary screen from the self-service racetrack wagering mode emulating, for example, an AmTote V3000 terminal This mode is entered into if "Live Racing" is selected at the screen shown in FIG. 3. With respect to the screen shown in FIG. 8, a player selects a particular track and race number on which the player wants to make a wager. After making these selections, the player can then select the particular game and horses to be played, along with a wager amount.

Game server 12 and terminal 18 may communicate often during the operation of the game terminal. The following describes the various types of transactions between game server 12 and terminal 18. These transaction descriptions are exemplary, and some transactions may not be necessary or more transactions may be required, depending on whether certain logic functions are performed by terminal 18 or game server 12.

Specifically, a currency/credit entry transaction occurs when a player adds to the credit available with terminal 18. The message sent to game server 12 contains the amount and type of credit.

A select game/mode transaction occurs when the player selects a type of game from a list of available game types, or selects a different mode for terminal 50, such as self-service live-race wagering.

An "Enter-bet" transaction occurs when the player presses "Bet" or "Quick Pick". The past-performance chart is returned from game server 12 to terminal 18 for. In addition, the features of Handi-Helper, Bet Max, and Start Game may be combined into one button to provide easier transactions for the player.

A "More-skill" transaction occurs when the player presses "More" while viewing a past-performance chart, and another chart is returned from game server 12 to terminal 18 for display. Within this one game play, the player is limited to fewer than the total number of available charts. In another embodiment, the Skillenator function may be used for betting skill (shown in FIG. 2).

A "Start" transaction initiates the transfer of the amount wagered, and the runners selected to game server 12. Server 12 responds to terminal 18 with data relating to which video to play, the winner/loser status, and the amount won if any. The response may also contain information for terminal 18 to "freeze and alarm" in the case of a major progressive winner, or any other special payoff situations. After this transaction between game server 12 and terminal 18, the actual video clip is transferred from video server 14 to terminal 18. The winner/loser status and amount won are revealed on terminal 18 at the end of the video clip play back.

A call attendant transaction, activated by pressing "Help", then "Call Attendant" requests that server 12 send a message to an administrative terminal calling an attendant for player assistance.

A terminal reset transaction causes terminal 18 to reset/reboot. A terminal download transaction causes terminal 18 to enter a download state, in which it will be downloaded with the most recent version of the terminal software. A terminal statistics transaction causes terminal 18 to send its local statistics to server 12.

On-line transaction processing requires a fully fault-tolerant, continuously available system, which preserves data integrity, incorporates online upgrades and online service, and does not degrade application performance in the event of a failure. Recovery from single component failure should be accomplished with little or no system downtime, and should be transparent to the transaction application. This continuous availability can be accomplished in system 10 with a hardware-based fault tolerant system, or with a combined hardware/software-based fault tolerant system.

Recovery from some multiple component failures must rely on software transaction processing services regardless of the hardware configuration. All database components updated by a single transaction must be, in effect, updated together. Every transaction which a user sees completed must be recoverable in the database. To accomplish this, the transaction must be recorded on at least two non-volatile media or two computer modules before the user acknowledgment is transmitted to terminal 18. To ensure that all of the database components updated by a single transaction are completed together, the transaction services can roll back the database to the condition it was in before any interrupted transaction.

A hardware-based fault tolerant system, such as systems commercially available from Stratus Computer, Inc., Marlboro, Mass., 01752, includes a single computer system with each of its major system components physically duplicated and operating in lockstep for full duplex operation. Self-checking is resident on each major circuit board to detect and immediately isolate failures. Any single component failure is immediately detected by the system and the component is isolated, allowing processing to continue on the partnered component with no performance degradation. Failed components may be replaced on-line and will resume duplex operations with no disruption to the application.

A hardware/software fault tolerant system, in one embodiment, follows the master-secondary model, with two identical servers functioning as a single duplexed system under software control. This method may be chosen when business file servers are used to construct game server 12. One server operates as the master, and the second server operates as a hot backup, or secondary system. A third identical server functions as a cold spare system. To maintain data integrity, each individual server has fully duplexed disks, with two copies of the transaction data on the master and two on the secondary. The servers are connected with redundant network connections. If the master server fails, the secondary server becomes the master transaction processor. A failure in the secondary computer would be completely transparent to the wagering network since the system would continue to operate in simplex mode. In case of failure of the master or the secondary server, the spare server would be brought on-line to become the new secondary server and resume duplex operation. Single system failures would cause no lost transactions. A failed computer would assume the role of cold spare and may be maintained and upgraded off-line with no disruption to the on-line system.

Transaction processing software suitable for game server 12 is commercially available from vendors of totalisator systems and lotteries. General purpose transaction processing software is also commercially available from many vendors, such as the Oracle Application Server commercially available from Oracle Corporation, Redwood Shores, Calif., 94065, and the Transaction Processing Facility commercially available from Stratus Computer, Inc., Marlboro Mass., 01752, for use on their fault-tolerant computers.

The above described gaming system can be utilized in connection with many different types of races such as animal races, for example, horse races and dog races. In addition, the system could be utilized in connection with other types of events. Importantly, the system supports and rewards the racing industry which produced the original wagering performances, which adds continuing "shelf life" and revenues for the original event.

From the preceding description of various embodiments of the present disclosure, it is evident that the system disclosure is attained. Although the system has been described and illustrated in detail, it is to be clearly understood that the same is intended by way of illustration and example only and is not to be taken by way of limitation. Accordingly, the spirit and scope of the system are to be limited only by the terms of the appended claims.

APPENDIX A

Exemplary Game Protocol for Quick Trifecta (QT)

©Copyright 1999 RaceTech L.L.C.

Summary: The QT bet requires selection of the first three finishers, in their exact order, for a single contest selected from the historical library. The contest from the historical library is selected at random before the player enters any selection. After the selections are registered, the identity of the contest is revealed, a video segment of the contest finish is shown, and the actual official results are displayed. If a player matches the first three finishers in order, he wins the Trifecta QT pool. If he matches only the first finisher, he wins the Win QT pool. Any winnings may be collected instantly. If a player wins the Trifecta QT three times in a row, then he wins the Carry Over QT pool.

Wager Amount: Only one dollar ($1) wagers are accepted for the QT.

Pool Split: After commissions have been deducted from the wager, the remaining amount is apportioned among four separate pools which have been carried over from previous contests played by all players: the Carry Over QT pool (A %), the Trifecta QT pool (B %), the Win QT pool (C %), and the Bonus/Minimum QT pool (D %).

A. The Carry Over QT pool has a minimum guaranteed amount of $AA,AAA. When the increasing Carry Over QT pool is won, it reverts to this guaranteed amount for the next winner.

B. The Trifecta QT pool has a minimum guaranteed amount of $BBB. When the increasing Trifecta QT pool is won, it reverts to this guaranteed amount for the next winner.

C. The Win QT pool has a minimum guaranteed amount of $C. When the increasing Win QT pool is won, it reverts to this guaranteed amount for the next winner.

D. The Bonus/Minimum QT pool is accumulated from the designated percentage of wagers and from the pricing round-off, as described below.

Trifecta QT Winner: If a player correctly selects the first three finishers in exact order, he wins the entire Trifecta QT pool, less pricing round-off. If two players win within a short time, the first winner is paid the current Trifecta QT pool, and the second is paid the new Trifecta QT pool, which begins with the guaranteed amount.

Carry Over QT Winner: If a player wins the Trifecta QT pool three times in a row, then he wins the entire Carry Over QT pool, less pricing round-off, instead of the Trifecta QT pool. If two players win the Carry Over QT pool within a short time, the first winner is paid the current Carry Over QT pool, less pricing round-off, and the second is paid the new Carry Over QT pool, which begins with the guaranteed amount.

Win QT Winner: If a player correctly selects the first finisher for first, but not the first three, he wins the entire Win QT pool, less pricing round-off. If two players win within a short time, the first winner is paid the current Win QT pool, less pricing round-off, and the second is paid the new Win QT pool, which begins with the guaranteed amount.

Dead Heat: If there is a dead heat for first, second, or third, the player has a chance to win for each winning combination.

Coupled Entries, Mutuel Fields: In a contest involving coupled entries and mutuel fields, only the highest placed member of the coupling is included in the order of finish. For example, if the order of finish is 1/1A/2/3, then the QT uses 1/2/3.

Bonus/Minimum QT Pool: To cover the cases when one of the guaranteed minimum amounts is paid, a Bonus/Minimum QT pool is accumulated from the designated percent of wagers, and from the pricing round-off. Each time one of the guaranteed minimum amounts is paid in excess of the actual amount available, the shortfall is deducted from the Bonus/Minimum QT pool. Whenever the Bonus/Minimum QT pool exceeds a designated maximum amount, the Win QT guaranteed amount is quadrupled.

Mandatory Distribution: Should the QT pool be designated for mandatory distribution on a specified date and performance, then after a scheduled time of day, the next Trifecta QT winner is paid the sum of the actual amount in the Win, Trifecta and Carry Over QT pools, plus any positive amount in the Bonus/Minimum QT pool, and no more bets will be accepted.

APPENDIX B

Exemplary Game Protocol for Thoroughbred Mania™

©Copyright 1999 RaceTech L.L.C.

Summary: The Thoroughbred Mania game requires selection of the first three finishers for a single race selected from the historical library. The race from the historical library is selected at random before the player enters any selection. The player may examine one or more charts showing the relative merits of the horses as they actually were on the day of the race. After the selections are registered, the identity of the race is revealed, a video segment of the race finish is shown, and the actual official results are displayed. A player wins by matching some or all of the first three finishers in one of seven different ways. Any winnings may be collected instantly. A player must risk a second unit bet in the wager to qualify for the highest value pool.

Wager Amount: At machines marked "$1 Per Play" one dollar ($1) unit bets are accepted. At machines marked "25.cent. Per Play" twenty-five cent ($0.25) unit bets are accepted. The player may enter only one or two unit bets per play.

Pool Split: After commissions have been deducted from the wager, the remaining amount is apportioned among several separate pools which have been carried over from previous races played by all players. The remaining amount of the first unit bet is apportioned among seven pools, including one pool for each of six ways to win, plus the Minimum Fund pool. The remaining amount of the second unit bet is apportioned between the highest value (3 Exact Order) pool and the. Minimum Fund pool. The percentages for apportioning the wager among commissions and the various pools will be posted.

Ways to Win: Wagers may qualify to win in up to seven different ways, including:

A. 3 Exact Order: The player's selections correctly match the first three finishers in exact order, only for players who risked two unit bets in the wager.

B. 3 Any Order: The player's selections correctly match the first three finishers in any order.

C. Top 2 Exact Order: The player's top two selections correctly match the first two finishers in exact order.

D. 3 to get Top 2: Any of the player's three selections correctly match the first two finishers in any order.

E. Top Pick Wins: The player's top selection correctly matches the first (winning) finisher.

F. Any 2 of 3: The player's selections correctly match any two of the three finishers in any order.

G. Any Pick Wins: Any one of the player's selections correctly matches the first (winning) finisher.

Payment Calculation: The winning price is the entire amount in the pool for which the wager qualifies, less the price round-off. When the wager qualifies to win more than one pool, the largest single amount is paid. Each pool has a minimum guaranteed amount, which will be posted. If two players qualify to win the same pool within a short time, the first winner is paid the current pool and the second is paid the new pool, which begins with the minimum guaranteed amount.

Dead Heat: If there is a dead heat for first, second, or third, the player has a chance to win for each winning combination.

Coupled Entries, Mutuel Fields: In a race involving coupled entries and mutuel fields, only the highest placed member of the coupling is included in the order of finish. For example, if the order of finish is 1/1A/2/3, then the Thoroughbred Mania game uses 1/2/3.

Minimum Fund pool: To cover the cases when one of the minimum guaranteed amounts is paid, the Minimum Fund pool is accumulated from a designated percent of wagers.

A. Each time the 3 Exact Order or the 3 Any Order pool is paid out, it is seeded to its minimum guaranteed amount from the Minimum Fund pool.

B. For the other five pools, each time its minimum guaranteed amount is paid in excess of the actual amount available in the pool, the shortfall is deducted from the Minimum Fund pool.

C. Whenever the Minimum Fund pool exceeds a designated maximum amount, a designated portion of the Minimum Fund is added to the 3 Exact Order pool as a bonus.

Mandatory Distribution: Should the Thoroughbred Mania game be designated for mandatory distribution on a specified date and performance, then after a scheduled time of day, the next 3 Any Order winner is paid the sum of the actual amount in the all of the pools, including any positive amount in the Minimum Fund pool, and no more bets will be accepted.

What is claimed is:

1. A system for parimutuel wagering on actual past events, said system comprising:

a video server comprising a database having video images of the actual past events stored therein;

a game terminal including a display; and a game server in communication with said game terminal and said video server, said game server programmed to:

facilitate pari-mutuel wagering on an actual past event stored in the database;

provide a seed pool associated with the pari-mutuel wagering, the seed pool including an award amount total from which winnings of the parimutuel wagering are provided;

identify a first threshold value associated with the award amount total;

determine that the award amount total is below the first threshold value; and automatically add additional award funds to the award amount total based at least in part on determining that the award amount total is below the first threshold value.

2. The system in accordance with claim 1, wherein the award funds are a monetary amount, wherein the award funds total is a seed pool reserve.

3. The system in accordance with claim 2, wherein said game server is further programmed to:

complete the pari-mutuel wagering, thereby generating an updated award amount total; and based on the completion of the pari-mutuel wagering, comparing the updated award amount total to the first threshold value, wherein determining that the award amount total is below the first threshold value is based at least in part on the comparing.

4. The system in accordance with claim 1, wherein the award funds total is associated with a first game for pari-mutuel wagering, wherein the additional awards funds are automatically added to the awards fund total from a main seed pool reserve associated with a plurality of games for parimutuel wagering that includes the first game.

5. The system in accordance with claim 1, wherein said game server is further programmed to compare the award amount total to the first threshold value on a pre-determined time interval.

6. The system in accordance with claim 1, wherein said game server is further programmed to compare the award amount total to the first threshold value at one or more of (i) the conclusion of daily operations and (ii) before the gaming terminal is made operational.

7. The system in accordance with claim 1, wherein said game server is further programmed to generate and transmit an alarm to an operator based at least in part on the determining.

8. A method for pari-mutuel wagering on actual past events, said method comprising:

facilitating, by a game server, pari-mutuel wagering on an actual past event stored in a database;

providing, by the game server, a seed pool associated with the pari-mutuel wagering, the seed pool including an award amount total from which winnings of the pari-mutuel wagering are provided;

identifying, by the game server, a first threshold value associated with the award amount total;

determining, by the game server, that the award amount total is below the first threshold value; and automatically adding, by the game server, additional award funds to the award funds total based at least in part on determining that the award amount total is below the first threshold value.

9. The method in accordance with claim 8, wherein the award funds are a monetary amount, wherein the award funds total is a seed pool reserve.

10. The method in accordance with claim 8, wherein the award funds total is associated with a first game for pari-mutuel wagering, wherein the additional awards funds are automatically added to the awards fund total from a main seed pool reserve associated with a plurality of games for pari-mutuel wagering that includes the first game.

11. The method in accordance with claim 10 further comprising:

completing, by the game server, the pari-mutuel wagering, thereby generating an updated award amount total; and based on the completing of the pari-mutuel wagering, comparing, by the game server, the updated award amount total to the first threshold value, wherein determining that the award amount total is below the first threshold value is based at least in part on the comparing.

12. The method in accordance with claim 8 further comprising comparing, by the game server, the award amount total to the first threshold value on a pre-determined time interval.

13. The method in accordance with claim 8 further comprising comparing, by the server, the award amount total to the first threshold value at one or more of (i) the conclusion of daily operations and (ii) before the gaming terminal is made operational.

14. The method in accordance with claim 8 further comprising generating and transmitting, by the game server, an alarm to an operator based at least in part on the determining.

15. Computer-readable non-transitory storage media having computer-executable instructions embodied thereon, wherein, when executed by at least one processor, the computer-executable instructions cause the processor to:

gain access to a database of actual past events on a video server to facilitate pari-mutuel via game terminal, on an actual past event stored in the database;

provide a seed pool associated with the pari-mutuel wagering, the seed pool including an award amount total from which winnings of the pari-mutuel wagering are provided;

identify a first threshold value associated with the award amount total;

determine that the award amount total is below the first threshold value; and automatically add additional award funds to the award funds total based at least in part on determining that the award amount total is below the first threshold value.

16. The computer-readable non-transitory storage media in accordance with claim 15, wherein the award funds are a monetary amount, wherein the award funds total is a seed pool reserve.

17. The computer-readable non-transitory storage media in accordance with claim 15, wherein the award funds total is associated with a first game for pari-mutuel wagering, wherein the additional awards funds are automatically added to the awards fund total from a main seed pool reserve associated with a plurality of games for pari-mutuel wagering that includes the first game.

18. The computer-readable non-transitory storage media in accordance with claim 17, wherein the computer-executable instructions further cause the processor to:

complete the pari-mutuel wagering, thereby generating an updated award amount total; and based on the completion of the pari-mutuel wagering, comparing the updated award amount total to the first threshold value, wherein determining that the award amount total is below the first threshold value is based at least in part on the comparing.

19. The computer-readable non-transitory storage media in accordance with claim 15, wherein the computer-executable instructions further cause the processor to compare the award amount total to the first threshold value on a pre-determined time interval.

20. The computer-readable non-transitory storage media in accordance with claim 15, wherein the computer-executable instructions further cause the processor to compare the award amount total to the first threshold value at one or more of (i) the conclusion of daily operations and (ii) before the gaming terminal is made operational.

21. The computer-readable non-transitory storage media in accordance with claim 15, wherein the computer-executable instructions further cause the processor to generate and transmit an alarm to an operator based at least in part on the determining.

* * * * *